US012427524B2

(12) United States Patent
Vazirani et al.

(10) Patent No.: US 12,427,524 B2
(45) Date of Patent: Sep. 30, 2025

(54) REAGENT STORAGE CONTAINER COMPRISING A SAMPLING PASSAGE WITH IMPROVED SEALING

(71) Applicant: ERBA DIAGNOSTICS LIMITED, Leopardstown (IE)

(72) Inventors: Nikhil Vazirani, Maharashtra (IN); Valentin Ghoris, Montpellier (FR); Martin Hackl, Graz (AT); Stephan Köstler, Kainbach (AT); Petra Theisl, Tillmitsch (AT)

(73) Assignee: ERBA DIAGNOSTICS LIMITED, Dublin (IE)

( * ) Notice: Subject to any disclaimer, the term of this patent is extended or adjusted under 35 U.S.C. 154(b) by 188 days.

(21) Appl. No.: 17/626,178

(22) PCT Filed: Jul. 17, 2020

(86) PCT No.: PCT/EP2020/070311

§ 371 (c)(1),
(2) Date: Jan. 11, 2022

(87) PCT Pub. No.: WO2021/009357

PCT Pub. Date: Jan. 21, 2021

(65) Prior Publication Data

US 2022/0274114 A1 Sep. 1, 2022

(30) Foreign Application Priority Data

Jul. 17, 2019 (FR) ........................................ 1908044

(51) Int. Cl.
*B01L 3/00* (2006.01)

(52) U.S. Cl.
CPC ....... *B01L 3/523* (2013.01); *B01L 2200/0689* (2013.01); *B01L 2200/16* (2013.01);
(Continued)

(58) Field of Classification Search
CPC ............. B01L 3/523; B01L 2200/0689; B01L 2200/16; B01L 2300/04; B01L 2300/123;
(Continued)

(56) References Cited

U.S. PATENT DOCUMENTS

| | | | |
|---|---|---|---|
| 9,101,936 | B2 | 8/2015 | Marcher et al. |
| 2001/0039058 | A1 | 11/2001 | Iheme et al. |

(Continued)

FOREIGN PATENT DOCUMENTS

| | | | |
|---|---|---|---|
| WO | 9716309 | A1 | 5/1997 |

OTHER PUBLICATIONS

PCT Search Report in co-pending related PCT Application No. PCT/EP2020/070311, mailedOct. 22, 2020.

(Continued)

*Primary Examiner* — Samuel P Siefke
(74) *Attorney, Agent, or Firm* — Thomas | Horstemeyer, LLP

(57) ABSTRACT

The present invention relates to a container for storing a reagent, the container comprising: a storage space for reagent (R) comprising a flexible pouch; a passage having a first end (4) that opens onto the outside of the container and a second end that opens into the storage space, the passage being designed to allow a sampling device (20) to access the storage space; a deformable partition (7) that closes off the passage when said partition is not mechanically loaded and which can be loaded by the sampling device to a position in which the passage is open; a seal (6) that is positioned in the passage and comprises an elastically deformable rim (64) defining an orifice (61) that is designed to receive part of the sampling device (20), said rim (64) being designed to establish a seal together with the outer walls of the sampling device when said device is introduced into the passage.

15 Claims, 8 Drawing Sheets

(52) U.S. Cl.
CPC ..... *B01L 2300/04* (2013.01); *B01L 2300/123* (2013.01); *B01L 2300/168* (2013.01)

(58) Field of Classification Search
CPC ......... B01L 2300/168; B01L 2200/023; B01L 2200/141; B01L 2300/044; B01L 2300/049; B01L 2400/0611; B01L 2400/0638; B01L 3/505
See application file for complete search history.

(56) References Cited

U.S. PATENT DOCUMENTS

| | | | | |
|---|---|---|---|---|
| 2008/0279487 | A1* | 11/2008 | Marcher | B65D 51/002<br>383/200 |
| 2014/0011292 | A1* | 1/2014 | Lentz | B01L 3/56<br>215/249 |
| 2015/0224497 | A1 | 8/2015 | Furrer et al. | |
| 2017/0258683 | A1 | 9/2017 | Tsakas et al. | |
| 2018/0290141 | A1 | 10/2018 | Knight | |
| 2020/0038853 | A1* | 2/2020 | Rydal | B32B 27/08 |

OTHER PUBLICATIONS

French Search Report in co-pending related French Application No. FR1908044, mailed Jul. 17, 2019.
French Written Opinion in co-pending related French Application No. FR1908044, issued Jul. 17, 2019.

* cited by examiner

REAGENT STORAGE CONTAINER COMPRISING A SAMPLING PASSAGE WITH IMPROVED SEALING

CROSS REFERENCE TO RELATED APPLICATIONS

This application is the 35 U.S.C. § 371 national stage application of PCT Application No. PCT/EP2020/070311, filed Jul. 17, 2020, which application claims the benefit of French Application No. FR 1908044, filed Jul. 17, 2019, both of which are hereby incorporated by reference herein in their entireties.

FIELD OF THE INVENTION

The present invention falls within the technical field of containers which can be used for the storage and/or transport of reagents, in particular liquids, for example for the analysis of biological samples. The invention applies for example to a container with deformable flexible walls, for example to a container of the infusion bag type. The container guarantees the sealing between a reagent contained in the container and the external environment, including during the insertion and extraction of a reagent sampling device.

STATE OF THE ART

In the context of the transport and storage of volumes of reagents, used to perform automated physiological measurements within the framework of the diagnosis of pathologies, reagents must not be contaminated by ambient air. It is therefore necessary to minimize the contact surfaces between the interior of the containers containing the reagents and the external environment.

Many diagnostic devices include rigid containers with an upper opening supposed to ensure the sealing for a liquid reagent contained therein. The upper opening includes a pre-pierced or pre-slit membrane. In the absence of a sampling device (such as a pipette), the slot remains closed, which guarantees the sealing for the reagent.

However, the length of the slot is necessarily greater than the outside diameter of the pipette, otherwise the pipette cannot be inserted correctly. While the pipette is inserted, the sides of the slot therefore provide space and air can flow from one side of the pre-pierced membrane to the other.

In addition, if the volume of reagent sampled during a sampling in such a rigid container is not replaced with air, the pressure inside the container decreases. Below a certain pressure in the container, the reagent sample becomes complex and inaccurate. To overcome this problem, it is common practice to “vent” the interior of the container, by adding air from the external environment within the container. However, the quality of the air thus introduced is uncontrolled and this air is likely to contain particles that disrupt the operation of the reagent or the pathogens.

For these two reasons, the reagent is very likely to be contaminated by ambient air when it is stored or transported in a rigid container.

As a variant, some rigid containers of the state of the art include a pierceable film, which hermetically seals the container before the first sampling, and which can be pierced on the passage of a pipette. The film is for example made of thin metal foil. However, the piercing of the film is not reversible and the periphery of the orifice made in the film after insertion of the pipette is not stuck to the pipette. Thus, the sealing is not guaranteed either during the first sampling or for subsequent samplings.

It has been proposed to provide the upper opening of the rigid containers with a movable stopper, for example mounted on a hinge.

However, this solution introduces mechanical controls for opening and closing the stopper which induce additional complexity; in addition, the sealing between the reagent and the external environment is not guaranteed during a sampling.

The varieties of rigid containers described above are therefore not satisfactory, in particular because they require venting the reagent contained in the container. The quality of the introduced air is uncontrolled, which accelerates the degradation of the reagent. The loss of reagent stability caused by this degradation is not acceptable for many applications.

The state of the art therefore does not provide a container of simple structure not requiring additional mechanical controls, while guaranteeing the sealing between the liquid reagent contained in the container and the external environment, including during the insertion and extraction of a pipette.

GENERAL DESCRIPTION OF THE INVENTION

There is therefore a need for a reagent storage container which prevents any exchange of fluid between the reagent contained therein and the external environment. The sealing of the interior of the container with respect to the external environment must be guaranteed before, during and after a sampling by a sampling device.

Preferably, the desired container must be compatible with conventional sampling devices such as pipettes. Thus, the parts ensuring the sealing must not require a too great penetrating force or specific shapes of the sampling device to be reached by the sampling device.

There is a further need for a container allowing suction of the reagent contained inside the container without pressure drop in the container. Indeed, it is preferable that the pressure within the container remains higher than that of the external environment during the sampling, otherwise the sampling is complex and inaccurate. For reagent stability reasons, the solution consisting in maintaining the pressure in the container by adding air from the external environment (“venting”) into the container is not satisfactory.

The desired container is preferably simple and inexpensive to manufacture.

As such, a first object of the invention is a container for storing a reagent, the container comprising a reagent storage space and a passage having a first end opening out outside the container and a second end opening out in the storage space, the passage being adapted to allow access to the storage space by a sampling device, the container including a deformable partition which closes off the passage when said partition is not mechanically stressed, and which can be stressed by the sampling device towards a position where the passage is open, said container being characterized in that it further includes a seal disposed in the passage, said seal being adapted to ensure a sealing with the outer walls of the sampling device when said device is introduced into the passage.

The reagent container of the invention thus comprises a passage allowing the insertion of a sampling device (for example a pipette) during a reagent sampling. The passage comprises, on one end, a deformable partition which constitutes a first sealing level, preventing the entry of air from the external environment into the reagent storage space in the absence of a sampling device in the passage, both before and after the sampling.

Said passage further comprises a seal. The walls of the sampling device cooperate with the seal so that the latter ensures a sealing with the outer walls of the sampling device. The seal constitutes a second sealing level, preventing the exchange of fluid between the external environment and the space containing the reagent while a sampling device is inserted into the passage.

The container of the invention has several advantages.

The combination of the two sealing levels—the deformable partition and the seal, both arranged on the passage of the sampling device—protects the reagent from any contamination by the external environment, whether before, during or after a sampling.

Insofar as the seal deforms in a reversible manner during the insertion of a sampling device (for example thanks to an elastically deformable rim of the seal), the sealing is again ensured by the seal during subsequent samplings.

In addition, the seal used to achieve the sealing during the sampling can be dimensioned to deform under the effect of a small penetrating force exerted by the sampling device. It is not necessary to provide a specific sampling device which is compatible with this container. A standard pipette, whose outer walls have an appropriate diameter in view of the dimensions of the seal, is suitable for the samplings.

Finally, the sampling passage of the container of the invention has a simple mechanical structure. The seal and the deformable partition can optionally be removed and replaced independently of each other.

The container defined above may also have, in an optional and non-limiting manner, the following characteristics, taken alone or in any one of the technically possible combinations:

- the storage space of the container comprises a flexible bag.

One advantage of this additional characteristic is that at least one wall of the flexible bag is capable of retracting during a reagent sampling to compensate for a drop in the pressure and/or a reduction in the volume of liquid in the storage space. Thus, there is no need to resort to a "venting" with potentially contaminated air.

The flexible bag can deform to adapt to pressure variations inside the storage space, which is particularly interesting in combination with the deformable partition and the elastically deformable seal as defined above. Indeed, this partition and this seal maintain the sealing between the interior of the storage space and the external environment, both during a sampling and between the samplings.

- the seal comprises an elastically deformable rim defining an orifice adapted to receive part of the sampling device, said rim being adapted to ensure a sealing with outer walls of the sampling device when said device is introduced into the passage.
- the elastically deformable rim is configured so that the orifice remains open in the absence of a sampling device in the passage.
- the elastically deformable rim is configured so that the orifice is circular in the absence of a sampling device in the passage.
- the elastically deformable rim is configured so that the orifice has a diameter of between 0.5 millimeters and 5 millimeters, in the absence of a sampling device in the passage.
- the elastically deformable rim has an internal perimeter, said rim being configured to adhere to the outer walls of the sampling device along the entire internal perimeter.
- the elastically deformable rim is configured to expand in a reversible manner by tilting in the direction of the reagent storage space upon insertion of the sampling device.
- the seal includes a truncated cone body.
- in the latter case, the truncated cone body ends with the elastically deformable rim.
- the seal comprises an outer annular edge and comprises an inner portion located radially between the outer annular edge and the elastically deformable rim,
- a thickness of the inner portion tapering from the outer annular edge until reaching a minimum thickness at the elastically deformable rim.
- the deformable partition comprises a pre-split membrane including a slot.
- the deformable partition is adapted to deform and open the passage under the effect of a penetrating force of the sampling device of between 0.1 and 10 Newton, preferably between 1 and 3 Newton.
- the container comprises a chimney traversed by the passage, said chimney being secured to the storage space.
- in the latter case, the outer annular edge is fixed to the chimney.
- the chimney ends with an enlarged head for the closing of the container.
- the enlarged head includes a plurality of ridges on which the flexible bag is welded.
- the chimney comprises a cap inside which an inner cavity extends, the deformable partition and the seal being disposed in the inner cavity.
- the partition has an outer annular partition edge and the cap has a shoulder at an internal edge of the inner cavity, the shoulder being complementary with the outer annular partition edge.
- the container has an external surface which is at least partly covered with a film comprising a material adapted to filter electromagnetic radiation harmful to the liquid reagent and/or adapted to reduce the porosity of the surface external to gases, said material being preferably aluminum.

A second object of the invention is an assembly for storing and sampling a reagent, comprising a container for storing a reagent as defined above, and comprising a sampling device, preferably a pipette, configured to be inserted at least partly into the passage of the container via the first end, and configured to deform the seal so as to ensure a sealing with the outer walls of the sampling device.

Optionally and advantageously, the storage and sampling assembly defined above has the following characteristics taken alone or in any one of the technically possible combinations:

- the seal has an elastically deformable rim which is configured to ensure the sealing with the outer walls of the sampling device.
- the elastically deformable rim defines an orifice adapted to receive part of the sampling device.
- the orifice has, at rest, a surface strictly smaller than a sectional surface of the sampling device, preferably a surface less than 99% of said sectional surface.

GENERAL DESCRIPTION OF THE FIGURES

Other characteristics, aims and advantages of the invention will emerge from the following description, which is purely illustrative and not limiting, and which should be read in relation to the appended drawings, among which:

FIG. 1*a* is a view of a reagent storage and transport container according to one exemplary embodiment of the invention, in which a chimney is seen separately from a flexible bag of the storage space.

FIG. 1*b* is an exploded view of the chimney of the container of FIG. 1*a*, in which a cap and the elements it contains are represented separately.

Figure 1A:
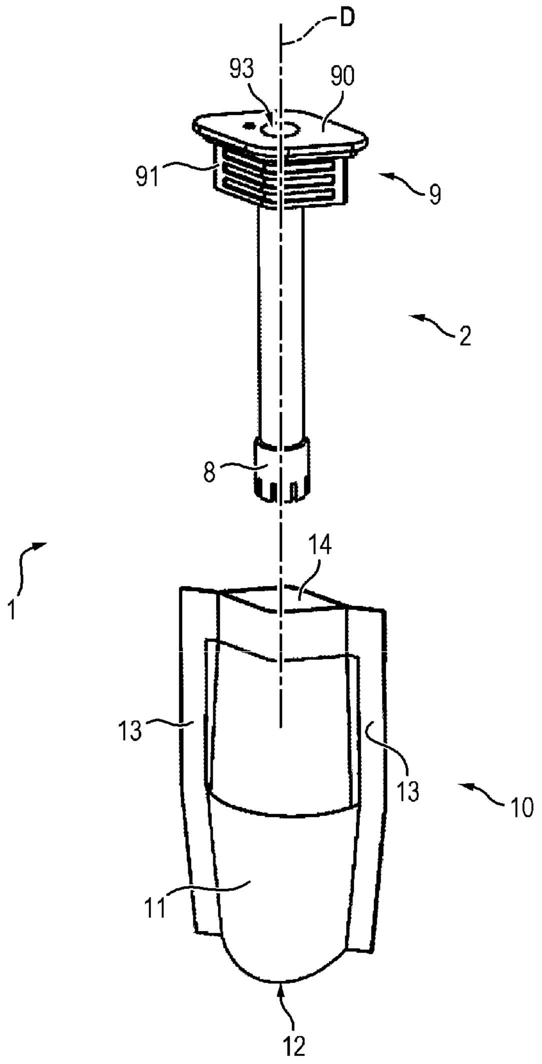
Figure 1B:
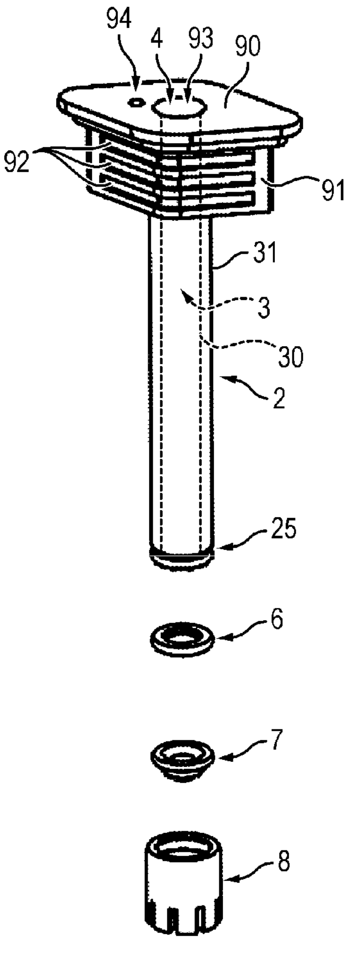
Figure 4A:
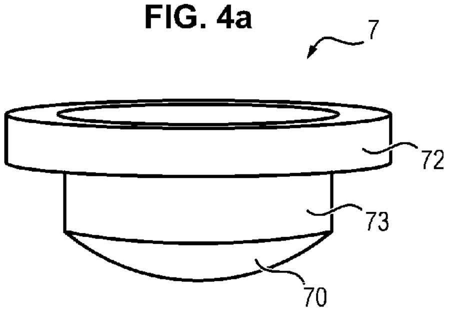

FIG. 4*a* is a perspective top view of a deformable partition of the container of FIGS. 1*a* and 1*b*.

Figure 4B:
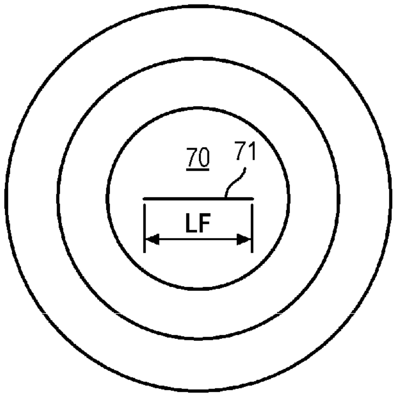

FIG. 4*b* is a top view of a deformable partition according to a first variant, in a closed position.

Figure 4C:
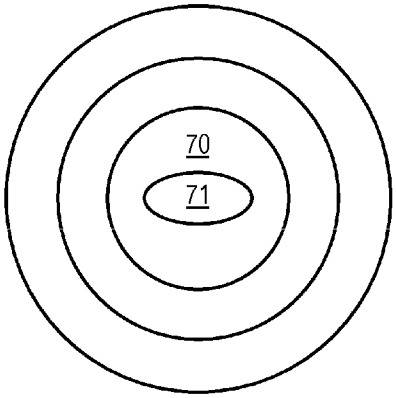

FIG. 4*c* is a top view of a deformable partition according to a first variant, in an open position.

Figure 4D:
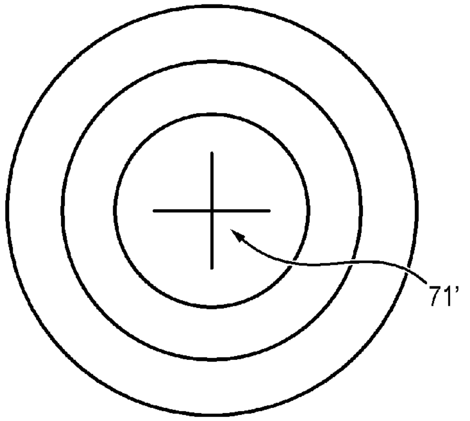

FIG. 4*d* is a top view of a deformable partition according to a second variant, in a closed position.

Figure 4E:
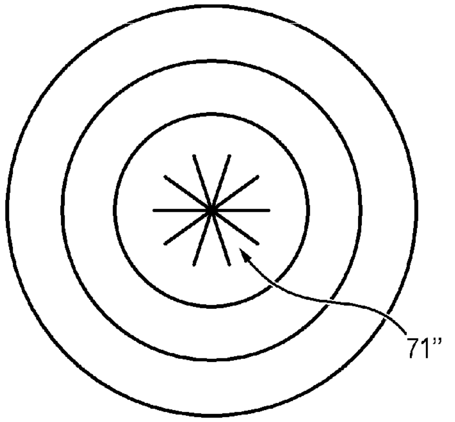

FIG. 4*e* is a top view of a deformable partition according to a third variant, in a closed position.

Figure 5A:
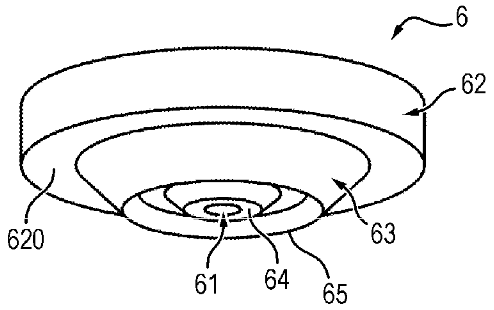

FIG. 5*a* is a perspective bottom view of a deformable seal of the container of FIGS. 1*a* and 1*b*.

Figure 5B:
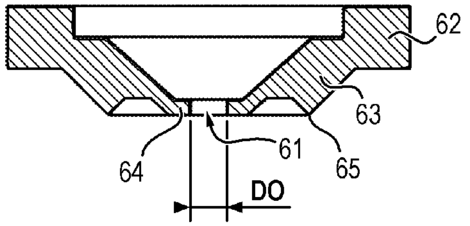

FIG. 5*b* is a side view of the seal of FIG. 4*a* in an unstressed position.

Figure 5C:
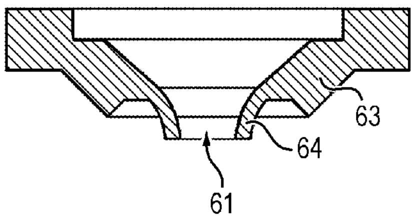

FIG. 5*c* is a side view of the seal of FIG. 4*a* in a deformed position.

Figure 6:
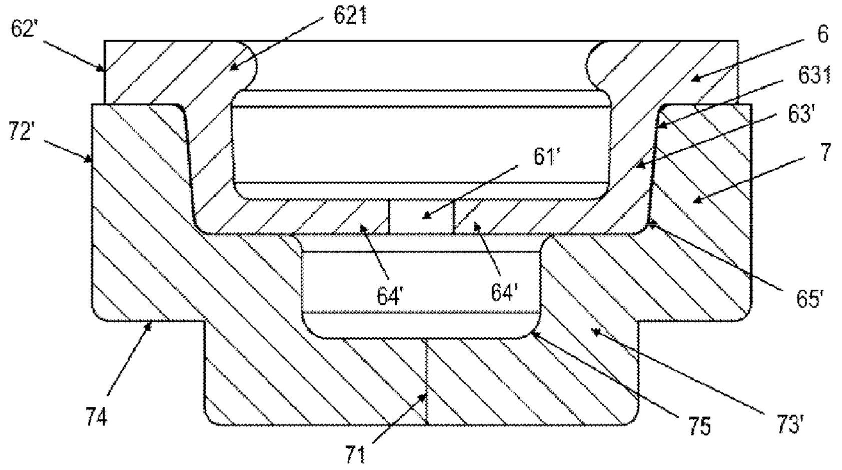

FIG. 6 is a longitudinal sectional view of an assembly including a deformable partition and a deformable seal according to a second exemplary embodiment. Said seal and partition can be mounted in a cap according to FIG. 3.

Figure 7A:
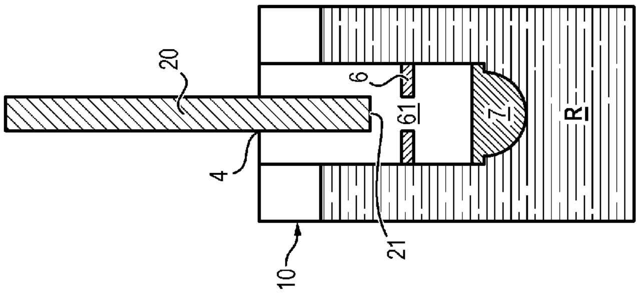

FIG. 7*a* schematically represents a reagent container and a sampling device at the beginning of the insertion of the sampling device.

Figure 7B:
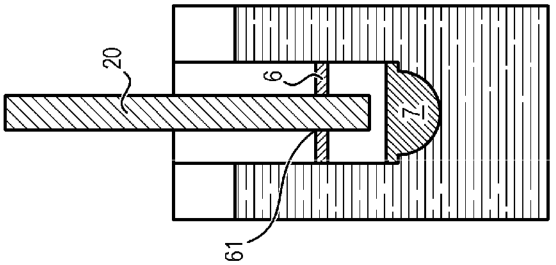

FIG. 7*b* schematically represents said container and sampling device at a later stage of the insertion of the sampling device.

Figure 7C:
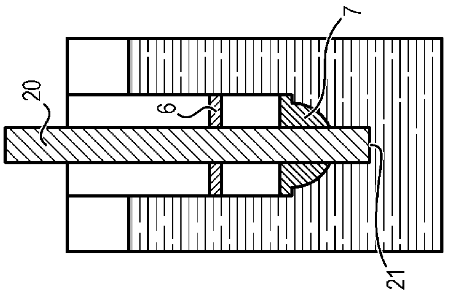

FIG. 7*c* schematically represents said container and sampling device at the end of the insertion of the sampling device.

DETAILED DESCRIPTION OF EMBODIMENTS OF THE INVENTION

The container examples described below relate to a container comprising a flexible bag of the "infusion bag" type adapted for the storage and transport of a reagent, in particular a liquid reagent. However, the invention can be applied for the storage of a reagent in a container whose walls are rigid.

In all of the appended drawings and in the description below, similar elements bear identical references.

Reagent Storage Container

FIGS. 1*a* and 1*b* illustrate a reagent storage container according to an exemplary embodiment. This container comprises a reagent storage space adapted to receive a reagent volume, for example in the liquid state, less than a predetermined volume.

In the present example, the storage space is formed by a flexible bag 10. By "flexible" is meant that at least one wall of the bag, and advantageously all the walls of the bag, are flexible and can deform under the effect of reagent suction inside the bag. Here, the flexible bag 10 comprises flexible walls 11 between which a storage space extends. The storage space allows receiving, storing and transporting a reagent, for example in the liquid state.

The use of a flexible bag, for example of the infusion bag type, is in particular advantageous because it allows avoiding an excessive pressure drop within the container during a reagent sampling, without it being necessary to resort to an introduction of potentially contaminating outside air. The walls of the flexible bag can deform to compensate for the pressure drop inside the bag during the reagent (in particular liquid reagent) sampling.

During the filling of the container, the atmosphere of the environment outside the container is preferably controlled. Thus, it is possible to introduce a small volume of air from this external environment, which is sterile, into the reagent storage space. In what follows, it will be meant by "controlled atmosphere" conditions either an absence of air in the reagent storage space, or the presence in this space of a volume of air whose quality is assumed to be satisfactory.

The objective is to maintain the conditions of a controlled atmosphere, by avoiding the introduction of air from another environment which could contaminate the reagent.

Thanks to the sealing between the reagent and the external environment guaranteed by the container of FIGS. 1 to 5, a user of the container filled with reagent is not required to maintain a sterile ambient environment in the room where the container is stored.

In FIG. 1*a*, the flexible bag 10 comprises a central space formed between two flexible walls 11 extending facing each other upwards from a bottom wall 12. The bottom wall 12 is preferably also flexible. The bottom wall 12 is preferably rounded or conical, in order to create a liquid collection bowl at the bottom of the flexible bag. This reduces the "dead volume" of the container, that is to say the reagent volume which can hardly be sampled. Alternatively, the bottom wall may have a planar shape to allow the container to be placed in a vertical position on a planar surface.

As a variant, the flexible bag 10 can be produced in a "vertical" or "doypack" manner by means of particular folding and welding techniques (for example in a manner similar to the one disclosed in document U.S. Pat. No. 4,837,849) so that a preferably rounded bottom wall 12 is obtained to create a liquid collection bowl and simultaneously allow the container to be placed in a vertical position on a planar surface.

In addition, the flexible bag 10 comprises, on both sides of the central space, junction portions 13. The flexible walls 11 forming the central space are stuck together at the level of the junction portions 13, preferably throughout the length of the central space.

On the upper part of the flexible bag 10 and between the junction portions 13, the flexible walls 11 are not joined together, so that the flexible walls 11 form an upper opening 14.

The flexible bag 10 is preferably made of polymer, for example of polyethylene or polypropylene. These materials have the advantage of being chemically compatible with the majority of the chemical compositions that the container may contain as reagents. In addition, these materials have the advantage of being easy to heat seal, which allows the formation of a flexible bag 10 by thermal welding along the junctions parts 13 and the attachment of the flexible bag to the vertical walls 91 of the head 9 or to the chimney walls 31 by thermal welding.

Optionally and advantageously, the container has at least one external surface which is at least partly covered with a protective film comprising a material adapted to filter electromagnetic radiation harmful to the liquid reagent (for example ultraviolet radiation), and/or to reduce the porosity of the surface external to gases. Preferably, the external surfaces of the two flexible walls 11 forming the central space of the flexible bag 10 are covered with such a film. An aluminum film is for example used to cover the walls. The protective film can have an additional role of improving the mechanical performance of the walls of the bag.

Optionally, the flexible bag is made of a multi-layer laminated film comprising different materials to contribute to different properties. The internal layer facing the reagent is preferably made of polyethylene or polypropylene film having the advantages of being chemically compatible with the majority of the reagents and of being able to be heat sealed. The thickness of this internal polymer layer is preferably between 20 and 200 micrometers, more preferably between 50 and 150 micrometers.

Further, the laminate is composed of at least one layer made of a polymer different from that of the internal layer. This layer plays a role in improving the mechanical performances of the walls of the bag. This layer is preferably chosen among a polymer material having higher mechanical strength and melting point than those of the polymer of the internal layer. Examples of such polymer materials are polyethylene terephthalate (PET) or polyamide (PA). The thickness of this at least one polymer layer is preferably between 5 and 100 micrometers, more preferably between 10 and 25 micrometers.

The laminated film may optionally contain an additional layer made of a protective material in order to block the electromagnetic radiation (such as light) and/or reduce gas permeability. The protective material can be chosen, for example, from aluminum, aluminum oxide, silicon oxide or another barrier material known from the state of the art. The protective material can be incorporated into the laminate either as a self-supporting film (for example by coextrusion or adhesive lamination) or as a very thin coating applied on one of the polymer layers (e.g. by vapor phase coating, liquid phase coating, electrochemical coating, etc.). The thickness of such a coating or protective film layer can therefore range from a value less than one micrometer up to 100 micrometers, preferably less than 50 micrometers, more preferably less than 20 micrometers. The use of thin coatings and thin polymer films is advantageous for reducing the rigidity of the flexible bag 10. Low rigidity and high flexibility are important in order to facilitate its ability to retract when the reagent is sampled and the pressure inside the reagent container is reduced.

It is preferable to arrange said film on the external surfaces so as to prevent contact between the particles of said film and the reagent contained in the container. In general, contact surfaces should be used between the flexible bag and the reagent which prevent the dissemination of particles of the wall material inside the reagent.

It should be noted that alternatively, the storage space could only comprise rigid walls and not be deformable under the effect of a pressure drop.

In accordance with the invention, the container further includes a sampling passage 3, having a first end 4 opening out outside the container as well as a second end opening out in the storage space. Here, the passage 3 opens out in the flexible bag via the second end. The passage 3 is schematically illustrated in dotted lines in the exploded view of FIG. 1*b*. The passage 3 is, in the present example, made inside a cylindrical chimney 2 which is added onto the flexible bag 10 during the manufacture of the container 1. The chimney is described below.

The passage 3 is adapted to allow a sampling device (not represented in FIGS. 1*a* and 1*b*) inserted into the passage to access the storage space. Here, the passage is made in a chimney 2 which will be described below, the chimney 2 being secured to the flexible bag 10.

The container includes a deformable partition 7. The partition 7 closes off the passage 3 at rest, when it is not mechanically stressed. The partition is here disposed inside the tubular internal wall which forms the sampling passage. The partition can be stressed by a sampling device towards an open position of the passage.

The partition 7 ensures a hermetic seal of the storage space. The fluid communication between the reagent storage space and the external environment via the passage 3 is prevented when the passage is not traversed by a sampling device—for example, when the container is waiting for sampling.

The container further includes a seal 6 disposed in the passage.

The seal 6 ensures the sealing between the outer walls of the sampling device and the walls of the passage (here the tubular internal wall of the chimney) when a sampling device is inserted into the sampling passage, typically during a reagent sampling. The seal prevents accidental communication of fluid (for example air) between the storage space and the exterior of the container during the sampling. Preferably, only the volume of reagent sampled by the sampling device is able to circulate between the interior of the storage space and the exterior of the container.

This avoids allowing air to enter from the external environment into the storage space during successive samplings of reagent by the sampling device, whether during the insertion of the sampling device, during the decanting of the reagent between the storage space and the sampling device, or during the extraction of the sampling device from the container.

The reagent thus remains stored under controlled atmosphere conditions.

The performances of the reagents are thus preserved during their storage in the container, whatever the environmental conditions: quality of the laboratory ambient air, presence of contaminants in the environment outside the container, etc.

The container described in relation to FIGS. 1 to 5 can therefore be used for the storage and transport of a wide variety of reagents, even with reagents very sensitive to interactions with the external environment.

Sealed Chimney

In FIG. 1*b*, the seal 6 ensuring the sealing during sampling is positioned above the partition 7 ensuring the sealing in the absence of sampling. The seal and the partition are positioned on the lower end of the cylindrical chimney 2. The upper part of the chimney 2 is fixed to an upper portion of the flexible walls 11 of the bag 10.

In one alternative configuration, the partition 7 can be positioned above the seal 6 within the passage. In general, the seal 6 and the partition 7 can be placed at any longitudinal position between the first end 4 and the storage space.

The chimney 2 is thus secured to the storage space and in particular with the flexible bag 10.

On a lower part, the chimney 2 comprises concentric internal side wall 30 and external side wall 31 extending parallel to the direction D. The sampling passage 3 is delimited by the internal side wall 30. The two walls 30 and 31 are sealed.

Alternatively and advantageously, the internal side walls 30 of the chimney are inclined relative to the direction D such that the inside diameter of the sampling passage 3 is reduced in the direction of the lower part of the chimney approaching the position of the seal 6. This has the advantage of guiding the sampling device 20 (for example a pipette) in the direction of the center of the sampling passage 3 during an insertion into the chimney and of aligning the center of the sampling device with the center of the orifice 61 of the seal 6. This prevents damage to the seal 6 during the insertion of the sampling device 20 due to positioning and alignment inaccuracies between the sampling device 20 and the reagent container 10.

As a variant, guide structures such as corners or rims narrowing the open space in the direction of the lower part of the chimney may be included on the internal side walls 30 of the chimney in order to achieve an equivalent alignment, or a "funnel" effect, between the orifice 61 and the inserted sampling device.

Advantageously, the upper part of the chimney 2 is fixed to the storage space at an enlarged head 9 of the chimney.

The head 9 is enlarged along a surface 90 substantially perpendicular to the direction D of extension of the sampling passage 3. Here, the head 9 is enlarged relative to the external side wall 31 of the chimney along all directions of the surface 90.

Here, the head 9 further comprises four walls 91 extending from the surface 90 in the direction of the lower end of the chimney. The ratio between the longitudinal extension of the walls 91 along the direction D and the total longitudinal extension of the chimney 2 is here low. This ratio is for example between 10% and 30%. The walls 91, seen from below, form for example a diamond shape.

Advantageously, the enlarged head 9 includes a plurality of ridges 92 for welding the walls of the flexible bag. The ridges 92 are here three in number and are hollowed out from outside in the four walls 91 of the head 9.

If the welding of the flexible bag on the chimney is performed by hot melting, the material of the walls of the flexible bag partially engages in the ridges during the welding. Thus, the ridges improve the mechanical cohesion and the sealing between the chimney 2 and the flexible bag 10 and guarantee the mechanical integrity of the container 1. The welding is performed at the walls 91, which are for example made of high density polyethylene or HDPE, low density polyethylene (LDPE), or polypropylene (PP).

As a variant, the flexible bag can also be welded directly on the external surface of the chimney 31, just below the head surface 90. This has the advantage of requiring only a narrow upper opening 14, which facilitates the retraction and the collapse of the flexible bag 10 when the reagent is sampled.

Advantageously, the surface 90 comprises a closing orifice 93 at the upper end 4 of the passage 3. The orifice 93 can be plugged during the manufacture of the container then opened during a sampling. The orifice 93 is for example plugged by a thin tear film. The tear film is made of sealed, preferably metal, material. The film is pierced by the insertion of a sampling device, or removed manually by a user before sampling. Alternatively or in combination with this thin tear film, the enlarged head 9 may comprise a removable stopper for closing the upper end of the passage 3. The removable stopper may comprise a cover mounted on a hinge.

The head 9 further comprises a micro-orifice 94 for the decanting of the reagent into the storage space, during the manufacture of the container containing the reagent. This micro-orifice allows not stressing the chimney with the seal 6 and the partition 7 from manufacture, so as not to damage these elements. The micro-orifice 94 can be plugged after this filling, by bonding of a film or by welding or bonding a tenon.

During the manufacture of the container, after the insertion of the chimney 2 via the upper opening 14, the top of the head 9 protrudes from the upper opening 14 formed by the flexible walls 11. The relative positioning of the chimney 2 and of the flexible bag 10 is thus facilitated and made more accurate.

The chimney 2 traversed by the sampling passage 3 thus forms a sealed sampling interface, added onto the flexible bag 10 via the upper opening 14 during the manufacture of the container 1.

Cap

Figure 2:
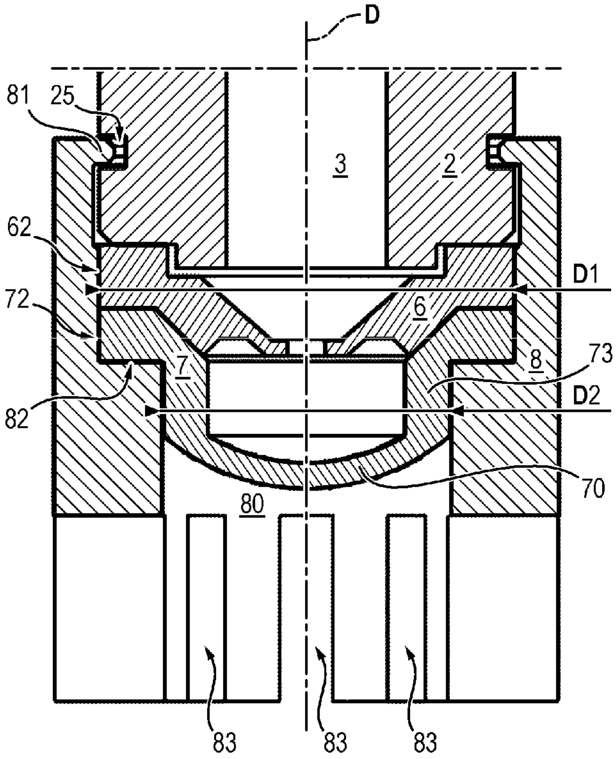
FIG. 2 is a longitudinal sectional view of the lower end of the chimney of FIGS. 1*a* and 1*b* while the cap is fixed on this lower end.

FIG. 2 illustrates the lower end of the chimney 2. The seal 6 and the partition 7 are represented here at rest, in the absence of stress from a sampling device. The passage 3 does not contain a sampling device in this figure.

In this example, the seal 6 and the partition 7 are fixed on the lower end of the chimney by a cap 8. The cap 8 has an upper edge 81 suitable for engaging in a groove 25 made at the lower end of the chimney, in the external side wall 31 of the chimney. Preferably, the groove is made over the entire circumference of the external side wall 31.

The cap 8 has a generally hollow cylindrical shape. On the upper part of the cap delimited by the upper edge 81, the thickness of the cap is small. On a middle part of the cap, the thickness of the cap is greater.

The internal walls of the cap thus delimit a first cavity part having a diameter D1 and a second cavity part which is concentric with the first part. The second cavity part has a diameter D2 which is smaller than the diameter D1 of the first cavity part. The two cavity parts together form an inner cavity 80 in which the seal 6 and the partition 7 are disposed, the latter being secured to the chimney 2.

The cap 8 comprises, at the interface between the upper part of the cap and the middle part of the cap, an internal edge which defines a shoulder 82.

This shoulder 82 is advantageous because it allows an outer annular edge 72 of the partition 7 to be held in position against the walls of the cap 8. Indeed, the shape of the shoulder 82 is here complementary to the shape of the outer annular edge 72 of the partition 7. The outside diameter of the outer annular edge 72 is equal to the diameter D1 and the partition 7 comprises a cylindrical portion 73 which extends downwards from the outer annular edge 72, the cylindrical portion 73 having an outside diameter equal to the diameter D2.

In addition, the seal 6 here also has an outer annular edge 62 whose diameter is equal to the diameter D1.

Thus, the seal 6 can be held in position against the partition 7, while the latter is itself held in position against the shoulder 82 of the cap.

Alternatively, the seal 6 and the partition 7 could be separated by a spacer. It is then necessary to ensure the sealing of the contact between the spacer and each of these two elements.

Thanks to this configuration, although the annular edges 62 and 72 have an outside diameter greater than the diameter of the internal side wall 30 of the chimney, it is possible to maintain the seal 6 and the partition 7 on the sampling passage 3.

One additional advantage of the cap 8 is to improve the sealing between the walls of the chimney 2 on the one hand and the seal 6 and the partition 7 on the other hand thanks to the compressive force exerted by the cap, while protecting laterally the sampling device during its insertion and its extraction.

One additional advantage of the cap 8 can be noted: the latter serves as a skirt to prevent the deformable walls of the flexible bag 10 from retracting until being very close to or in contact with the lower end of the chimney 2, when the pressure within the flexible bag drops during the sampling of the reagent. The lower edge of the cap 8 blocks the walls of the flexible bag and forms a reagent sampling chamber.

As an option, the cap 8 has, on a lower part, a plurality of slots 83. Here, the slots 83 extend vertically and are in the shape of chevrons evenly distributed around the perimeter of the cap.

Figure 3:
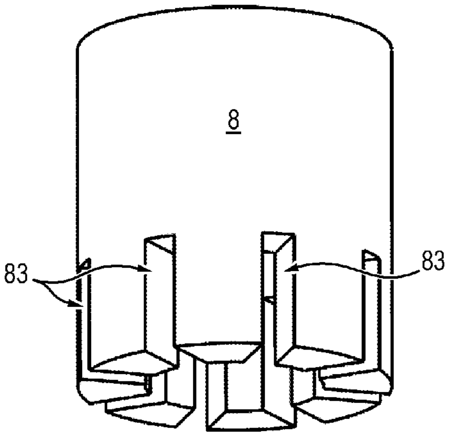
FIG. 3 is a bottom perspective view of a cap of the container of FIGS. 1*a* and 1*b*.

As can be seen in FIG. 3, the slots 83 pass through the thickness of the cap, so that the inner cavity is accessible by the slots 83 from the outside.

The chimney 2 is configured so that a lower end 21 of a sampling device 20 (such as a pipette) inserted into the passage 3 reaches the inner cavity of the cap during a reagent sampling.

Thus, the inner cavity delimits the sampling chamber. One advantage of the slots 83 is to put the inner cavity in direct communication with the reagent storage space. If the reagent is in the liquid state and if the liquid level exceeds the level of the cap 8, the renewal of the reagent within the sampling chamber is facilitated by the slots 83.

Another advantage of the slots 83 is that they prevent the trapping of air and air bubbles in the cavity space under the partition 7, which could cause inaccurate reagent sampling.

Deformable Partition

To prevent fluid communication between the storage space comprising the reagent and the external environment in the absence of a sampling device in the passage, and in particular to prevent air from the external environment from infiltrating into the storage space, the container 1 comprises a deformable partition 7.

Preferably, the partition 7 is configured to deform and allow access to a reagent contained in the storage space by a sampling device, under the effect of a low penetrating force. The penetrating force necessary for opening the partition is preferably between 0.1 and 10 Newton, and even more preferably between 1 and 3 Newton.

The container including the partition is thus compatible with a wide range of sampling devices. The partition 7 can be stressed towards an open position by a simple pipette. Conversely, the use of a non-pre-pierced elastic membrane—such as the one used in some blood sampling tubes—instead of the partition 7 would require a significant penetrating force to allow the opening, which would restrict the scope of the usable sampling devices.

FIGS. 4*a* to 4*c* represent a partition 7 according to a first variant corresponding to the partition of FIG. 2. This partition comprises a pre-split membrane.

The partition 7 has the general shape of a hat. It comprises the outer annular edge 72 and the cylindrical portion 73. The portion 73 has the shape of a hollow cylinder, the face located on the side of the annular edge 72 being open and the opposite face being closed by the pre-slit membrane 70.

The pre-slit sealed membrane 70 includes at its center a slot 71 which can be opened by a sampling device. One advantage is that this type of partition is easy to implement and does not require expensive materials.

As a variant, the partition 7 may be directly molded on the internal side walls of the cap 8 by a two-component injection molding process intended to manufacture a single molded part comprising the cap 8 with the integrated partition 7. This further facilitates an assembly with the corresponding chimney 2.

In the example of FIGS. 4*a* to 4*c*, the pre-slit membrane 70 has the shape of a slightly rounded dome. The slot 71 is easy to open by a sampling device and requires a low penetrating force. Alternatively, the membrane 70 may have a “duckbill” type shape. The duckbill shape of the membrane also requires a low penetrating force, while ensuring that the elastic deformation of the membrane 70 is responsive. By “reactive” is meant that the time between a withdrawal of the sampling device and an elastic return of the membrane 70 to its shape at rest is short. Still alternatively, the membrane 70 can be planar.

In the rest position, the slot 71 is closed (FIG. 4*b*). As the walls of the chimney 2 and of the flexible bag 10 as well as the membrane 70 are sealed, the partition 7 guarantees a good sealing between the interior of the container and the external environment before and after a sampling.

In an open position, the edges of the slot 71 are moved apart, so that an opening is formed in the membrane 70 (FIG. 4*c*).

Preferably, the membrane is configured to allow the formation of an opening of minimum diameter greater than an outside diameter of the walls of a sampling device.

The material of the membrane 70 is chosen to allow reversible elastic deformation of the membrane. The membrane is preferably made of polymer, for example elastomer. Possible materials, taken alone or in combination, are silicone, EPDM (ethylene-propylene-diene monomer) or a fluoropolymer, a thermoplastic elastomer (TPE), or a thermoplastic polyurethane elastomer (TPU).

Preferably, the material of the membrane 70 is hydrophobic, in the case of aqueous reagents (generally not very wettable by the reagent medium). This limits the wetting of the walls of the membrane 70 and creates capillary pressure to further prevent the passage of liquid through the slot 71, in the case of an open position during the insertion, the reagent aspiration and the retraction of a sampling device.

The pre-slit membrane easily returns to its rest position after extraction from the sampling device. Thus, the sealing before and after the sampling remains fully satisfactory, even after a large number of samplings.

FIG. 4*d* illustrates a second variant of the partition 7. Here, the membrane 70 is traversed by two substantially perpendicular slots 71', drawing a cross shape on the membrane. A sampling device can pass through the center of the cross.

FIG. 4*e* illustrates a third variant of the partition 7. The cross shape of the second variant is here replaced by a star shape formed of five slots. Two consecutive slots form an angle of approximately 35° therebetween. One advantage of this shape is that the penetrating force required for a sampling device to spread the membrane and open the passage is lower. Another number of slots can be chosen based on the desired compromise between penetrating force required for the insertion of the sampling device and performances in terms of sealing.

The partition 7 allows a good sealing before and after a sampling.

However, during a sampling, that is to say, while a sampling device is inserted into the container and passes through the sampling passage, there is a fluid communication space between the outer walls of the sampling device and the edges of the slot 71 of the deformable partition 7. Fluids, and particularly air, can enter the storage space from the external environment and contaminate the reagent.

To overcome this problem, the container 1 further includes a deformable seal 6.

Deformable Seal

The seal 6 is disposed on the sampling passage 3. A function of the seal 6 is to conform to the circumference of the outer walls of a sampling device inserted into the sampling passage 3, so as to ensure a direct sealing with the sampling device 20 during the sampling phases.

FIGS. 5*a* to 5*c* are close-up views of the example of the seal 6 used in the container represented in FIG. 2. FIGS. 5*a* and 5*b* correspond to the rest position of the seal 6, while FIG. 5*c* corresponds to a deformed position.

The seal 6 has, at rest, a central orifice 61 visible in FIGS. 5*a* to 5*c*. Very advantageously, the orifice 61 remains open in the absence of a sampling device in the sampling passage 3. Indeed, thanks to the partition 7, the sampling passage 3 remains obstructed in the absence of a sampling device.

In this example, the seal 6 has the general shape of a hat and includes an outer annular edge 62 which extends into a truncated cone shaped body 63 inclined inwardly of the annular edge. The body 63 is hollow and ends inwardly with an elastically deformable rim 64. The elastically deformable rim 64 defines the central orifice 61.

The elastically deformable rim 64 can conform to the outer walls of the sampling device 20, when the latter is engaged in the sampling passage 3.

Preferably, the elastically deformable rim 64 is provided to adhere to the outer walls of the sampling device 20, along an entire internal perimeter of the elastically deformable rim 64. In other words, the entire periphery of the elastically deformable rim 64 is pressed against the outer walls of the sampling device 20 and sticks to said walls, which prevents an entry or exit of air via the passage 3.

The central orifice 61 is chosen so as to present, at rest, a surface strictly less than a sectional surface of a sampling device used with the container. The surface of the orifice 61 is preferably less than 99% of said sectional surface of the sampling device, even more preferably less than 95%.

In the present example, the orifice 61 has a substantially circular shape. The orifice 61 is here delimited by the interior of the rim 64. In the case where the central orifice 61 is circular at rest, the central orifice 61 preferably has a diameter OD at rest of between 0.5 and 5 millimeters.

The deformability of the rim 64 is, for example, obtained by a localized thinning of the walls of the body 63 in the vicinity of the orifice 61.

From the outer annular edge 62, the body 63 extends downwards (that is to say towards the partition 7, when the seal 6 and the partition 7 are engaged together) by tapering inwardly, that is to say by tapering up to the rim 64. The thickness at the rim 64 along a normal direction is, for example, at least 2 times less than the thickness at the outer annular edge 62 along a normal direction, and preferably at least 3 times less.

Here, from a circular edge 65 of the body 63, visible from below in FIG. 5*a*, the walls of the body 63 narrow inwardly and taper up to the orifice 61.

The rim 64 thus forms, in the example of FIG. 5*a*, a second truncated cone concentric with the truncated cone shaped body 63.

The walls of the rim 64 are represented in FIG. 5*c* in a position deformed by a sampling device (the latter not being illustrated in the figure). When a penetrating force is exerted from top to bottom on the rim 64, said rim expands in a reversible manner by tilting towards the storage space of the container, that is to say downwards here.

Thus, the orifice reversibly deforms to allow the passage of the sampling device 20, while ensuring continuous contact with its walls. The rim 64 therefore operates as an O-ring. In the present example, the central orifice 61 expands in a reversible manner at the passage of the walls of the sampling device during its insertion.

Preferably, a sampling device whose outer walls have an outside diameter greater than the diameter DO of the orifice 61 of the seal 6 at rest, is used. Thus, during the insertion of the sampling device and its passage through the seal 6, the rim 64 is elastically deformed and moves apart.

A sealing lip is thus created by the seal 6 over the entire circumference of the outer walls of the sampling device.

The seal 6 thus constitutes a second level of sealing which completes the first level formed by the deformable partition 7. The seal 6 prevents the exchanges of fluid between the external environment and the space containing the reagent, even when the partition 7 is open, in particular during a sampling.

It will be recalled that, preferably, the walls of the container comprise a flexible bag 10, formed by the flexible walls 11 between which the storage space extends. The flexible bag 10 can adapt to the pressure variations inside the storage space over the samplings. It is therefore not necessary to "vent" the interior volume of the storage space.

Thus, it is particularly relevant to equip the container with the partition 7 and the seal 6, which prevent the exchanges of fluid between the interior of the storage space and the environment.

The rim 64 is preferably made of polymer, for example elastomer. Possible materials of the rim, taken alone or in combination, are silicone, EPDM (ethylene-propylene-diene monomer) or fluoro-polymer, thermoplastic elastomer (TPE) or thermoplastic polyurethane elastomer (TPU).

In the example where the partition 7 comprises a pre-slit membrane with a slot 71, the latter has a length LF greater than the diameter DO of the orifice 61 of the seal 6 at rest. This configuration allows the insertion of the sampling device through the seal 6 and the partition 7 simultaneously, while allowing good adhesion of the walls of the orifice 61 against the walls of the sampling device.

In one alternative manufacturing method, the seal 6 can be directly attached and molded onto the lower end of the chimney 2 by a two-component injection molding process so that a single molded part comprising the chimney 2 and the seal 6 is manufactured. This further facilitates insertion and assembly with the corresponding cap 8.

Alternative Example of an Elastically Deformable Seal and a Partition

FIG. 6 represents a deformable partition 7 and a deformable seal 6 according to an alternative example, mounted together. The sectional view of FIG. 6 corresponds, for example, to an insertion position of the seal 6 and of the partition 7 in the cap 8.

The general function of the seal 6 and of the partition 7 is unchanged. The partition 7 guarantees the sealing between the interior of the container and the external environment, before and after a sampling. The seal 6 conforms to the circumference of the outer walls of a sampling device inserted into the sampling passage 3, so as to ensure a direct sealing with the sampling device 20, during the sampling phases.

The seal 6 has, here again, a deformable central orifice 61', adapted to open in a reversible manner. The orifice 61' is defined by an elastically deformable rim 64'. Preferably, the rim 64' expands in a reversible manner by tilting towards the storage space (that is to say here in the direction of the partition 7) when a sampling device 20 is inserted.

The seal 6 has an outer annular edge 62', intended to be positioned against the internal walls of the cap 8 or against the internal walls of a sampling passage. In the present example, the seal 6 has a bead 621 on the radially internal side opposite to the outer annular edge 62'. The seal 6 has an extra thickness at the bead 621.

One advantage of the bead 621 is to enhance the mechanical integrity and the strength of the seal 6, when it is held in position inside the container.

The seal 6 according to the variant of FIG. 6 comprises a truncated cone shaped body 63', ending with the elastically deformable rim 64'. The truncated cone shaped body 63' extends downwards (that is to say towards the partition 7, when the seal 6 and the partition 7 are engaged together) from the bead 621, that is to say in the direction of the partition 7 when the seal 6 and the partition 7 are engaged together.

The body 63' has an edge 631 complementary with an internal edge of the partition 7. The edge 631 tilts inwards less rapidly when getting closer to the storage space, compared to the inclination of the truncated cone shaped body 62 of the seal illustrated in FIGS. 5*a* to 5*c*. The edge 631 ends with a rounded corner 65'. The angle formed by the rounded corner 65', between the edge 631 and the surfaces of the rim 64', is close to a right angle. Said angle is for example between 90° and 120°.

The rounded corner 65' is complementary with a shoulder formed on the internal side of the partition 7. One advantage is to ensure stable support of the seal 6 on the partition 7, and in particular to limit the risks of slipping of the seal 6 relative to the partition 7 when the sampling device is inserted and deforms the rim 64'.

From the outer annular edge 62', the body 63' extends downwardly by tapering inwardly, that is to say, tapering up to the elastically deformable rim 64'. The thickness at the rim 64' along a normal direction is, for example, at least 2 times less than the thickness at the bead 621 along a normal direction.

Thus, during the insertion of the sampling device 20, the central orifice 61' expands in a reversible manner at the passage of the outer walls of the sampling device. Preferably, the rim 64' is, again, configured to adhere to the outer walls of the sampling device 20 along an entire internal perimeter of the rim 64'.

The partition 7 according to the variant of FIG. 6, like the example of partition described above, is configured to deform and allow access by the sampling device 20 to a reagent contained in the storage space, under the effect of a low penetrating force. The penetrating force necessary for opening the partition 7 is preferably between 0.1 and 10 Newton, and even more preferably between 1 and 3 Newton.

Preferably, the partition 7 comprises a pre-slit membrane, having a slot 71 provided to open to the passage of the sampling device 20.

In the present example, the partition 7 has the general shape of a staircase. The partition 7 thus has an upper portion of large diameter, close to the diameter of the outer annular edge 62' of the seal 6, and has a lower portion comprising the pre-slit membrane (by lower portion is meant the portion directed towards the partition 7, when the seal 6 and the partition 7 are engaged together).

The upper portion has an annular edge 72' provided to press against the walls of a cap or a sampling passage. The upper portion and the lower portion of the partition 7 are interconnected by an intermediate cylindrical portion 73'. The outside diameter of the intermediate portion 73' is smaller than the diameter of the upper portion.

In the present example, instead of a dome-shaped pre-slit membrane, the partition 7 has a pre-slit membrane of generally planar shape at the lower portion.

As with the seal and partition variants represented in FIG. 2, the seal 6 illustrated in FIG. 6 can be held in position against the partition 7 illustrated in FIG. 6, while the latter is itself held in position against the shoulder 82 of the cap 8 of FIG. 3. The shoulder 82 allows the annular edge 72' of the partition 7 to be held in position against the walls of the cap 8. Thus, the seal 6 and the partition 7 can be positioned in a stable manner inside the cap 8.

Reagent Sampling Method FIGS. 7*a* to 7*c* illustrate successive steps of a liquid reagent sampling using a reagent storage and sampling assembly.

The latter assembly comprises a reagent storage container comprising a flexible bag 10 and a sampling passage with a seal 6 and a partition 7, for example the container described above in relation to FIGS. 2 to 5*c*. Alternatively, the sampling passage includes a seal 6 and a partition 7 in accordance with the variant described above in relation to FIG. 6.

The reagent is here stored under a controlled atmosphere, possibly with a small volume of sterile air present in the storage space for the reagent R. This assembly also comprises a sampling device configured to be inserted at least partly into the passage 3 and to deform the seal 6. A pipette is used here as a sampling device 20.

As indicated above, the seal 6 and the partition 7 form two sealing levels, so that the sealing between the reagent R contained inside the flexible bag 10 and the external environment is ensured before, during and after a sampling. The level of reagent R exceeds the vertical position of the partition 7.

Referring to FIG. 7*a*, the empty pipette is inserted via the upper end 4 of the sampling passage. In this example, the seal 6 is located above the partition 7 in the sampling passage. The partition 7 is positioned at the lower end of the sampling passage. The central orifice 61 has a diameter smaller than the diameter of the outer walls of the end 21 of the pipette.

In relation to FIG. 7*b*, the end 21 of the pipette first passes through the seal 6. The walls of the orifice 61 of the seal 6 are deformed in the direction of a widening of the orifice, to allow the passage of the end 21 of the pipette. Here, the rim 64 of seal 6 expands and tilts downwardly to open towards the reagent storage space, in a reversible manner.

As indicated above, the rim 64 then adheres preferably to the outer walls of the pipette along the entire internal perimeter of the rim 64.

In relation to FIG. 7*c*, the insertion of the pipette up to the interior of the flexible bag 10 ends with the passage of the partition 7 through the end 21 of the pipette. Here, the partition 7 comprises a membrane pre-split by a central slot.

The end 21 exerts a penetrating force on the edges of the slot, which has the effect of moving said edges apart and forming an opening which allows the passage of the pipette. Finally, the end 21 reaches the volume occupied by the reagent R, which allows the sampling.

Since the walls of the storage space are flexible, the pressure reduction caused by the decrease in the volume of liquid is compensated by a retraction of the walls of the storage space. Thus, the pressure inside the container remains preferably substantially constant, without the need for venting the reagent.

Once the sampling of the desired volume of reagent R has been completed, the sampling device can be removed via the upper end 4 of the sampling passage.

Since the deformation of the seal 6 and of the partition 7 during the insertion of the sampling device 20 is reversible, the partition 7 returns to its closed position after withdrawal of the sampling device. In addition, the seal 6 returns to its rest position, in which the orifice 61 is open.

Thus, another sample can be taken later using the pipette or possibly using another sampling device. The seal 6 and the partition 7 ensure the sealing between the reagent R and the external environment before, during and after this new sampling.

The invention claimed is:

1. An assembly for storing and sampling a reagent, comprising:

- a container for storing a reagent, the container comprising:
- a reagent storage space, said reagent storage space comprising a flexible bag,
- a passage having a first end opening out outside the container and a second end opening out in the reagent storage space,
- a chimney traversed by the passage, said chimney extending inside the reagent storage space between an upper part and a lower end, the upper part of the chimney being secured to the reagent storage space,
- a sampling device configured to be inserted at least partly into the passage the first end to access the reagent storage space,
- the container further comprising:
- a deformable partition having a closed position wherein the deformable partition closes off the passage when said partition is not mechanically stressed, and which is able to be stressed by the sampling device towards an open position wherein the passage is open, wherein the deformable partition returns to the closed position when the deformable partition is no longer mechanically stressed,
- a seal disposed in the passage, said seal comprising an elastically deformable rim defining an orifice adapted to receive part of the sampling device, said elastically deformable rim being adapted to
- pass from a relaxed state to a deformed state when the sampling device is inserted in the orifice,
- adhere to outer walls of the sampling device to seal the orifice when the sampling device is in the orifice,
- pass from the deformed state to the relaxed state when the sampling device is withdrawn from the orifice,
- wherein the seal and the deformable partition are positioned on the lower end of the chimney.

2. The assembly according to claim 1, wherein the elastically deformable rim is configured so that the orifice is circular and has a diameter of between 0.5 millimeters and 5 millimeters, in the absence of a sampling device in the passage.

3. The assembly according to claim 1, wherein the elastically deformable rim is configured to pass from the deformed state to the relaxed state by tilting towards the reagent storage space upon insertion of the sampling device.

4. The assembly according to claim 1, wherein the seal includes a truncated cone body ending with the elastically deformable rim.

5. The assembly according to claim 1, wherein the seal comprises an outer annular edge and further comprises an inner portion located radially between the outer annular edge and the elastically deformable rim,

- a thickness of the inner portion tapering from the outer annular edge until reaching a minimum thickness at the elastically deformable rim.

6. The assembly according to claim 1, wherein the deformable partition comprises a pre-slit membrane including a slot.

7. The assembly according to claim 1, wherein the seal comprises an outer annular edge and further comprises an inner portion located radially between the outer annular edge and the elastically deformable rim,

- a thickness of the inner portion tapering from the outer annular edge until reaching a minimum thickness at the elastically deformable rim,
- and wherein the outer annular edge is fixed to the chimney.

8. The assembly according to claim 1, wherein the chimney ends comprises an enlarged head for closing the container, the upper part of the chimney being secured to the reagent storage space at the enlarged head.

9. The assembly according to claim 8, wherein the enlarged head includes a plurality of ridges on which the flexible bag is welded.

10. The assembly according to claim 1, wherein the chimney comprises a cap inside which an inner cavity extends, the deformable partition and the seal being disposed in the inner cavity and fixed on the lower end of the chimney by the cap.

11. The assembly according to claim 10, wherein the deformable partition has an outer annular partition edge and wherein the cap has a shoulder at an internal edge of the inner cavity, the shoulder being complementary with the outer annular partition edge.

12. The assembly according to claim 1, wherein the container has an external surface which is at least partly covered with a film comprising a material adapted to filter electromagnetic radiation harmful to the liquid reagent and/or adapted to reduce the porosity of the surface external to gases.

13. The assembly according to claim 12, wherein said material is aluminum.

14. The assembly according to claim 1, wherein the flexible bag comprises a bottom wall, the bottom wall being conical.

15. The assembly according to claim 1, wherein the elastically deformable rim is configured so that the orifice has, at rest, a surface strictly smaller than a sectional surface of the sampling device.

* * * * *